(12) United States Patent
Yin et al.

(10) Patent No.: US 8,391,353 B2
(45) Date of Patent: *Mar. 5, 2013

(54) METHODS AND APPARATUS FOR ARTIFACT REMOVAL FOR BIT DEPTH SCALABILITY

(75) Inventors: Peng Yin, Plainsboro, NJ (US); Jiancong Luo, Plainsboro, NJ (US); Yong Ying Gao, Beijing (CN); Yu Wen Wu, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 287 days.

This patent is subject to a terminal disclaimer.

(21) Appl. No.: 12/734,205

(22) PCT Filed: Oct. 14, 2008

(86) PCT No.: PCT/US2008/011708
§ 371 (c)(1),
(2), (4) Date: Apr. 16, 2010

(87) PCT Pub. No.: WO2009/051690
PCT Pub. Date: Apr. 23, 2009

(65) Prior Publication Data
US 2010/0220795 A1    Sep. 2, 2010

Related U.S. Application Data

(60) Provisional application No. 60/980,322, filed on Oct. 16, 2007.

(51) Int. Cl.
*H04N 7/12* (2006.01)
(52) U.S. Cl. ........ 375/240; 345/600; 382/268; 382/261; 382/275; 382/232

(58) Field of Classification Search ................ 345/600; 375/240.29, E07.193; 382/232, 261, 268, 382/275
See application file for complete search history.

(56) References Cited

U.S. PATENT DOCUMENTS

| 5,748,763 | A | 5/1998 | Rhoads |
| 5,754,704 | A | 5/1998 | Barnsley et al. |
| 5,940,089 | A | 8/1999 | Dilliplane et al. |
| 6,711,297 | B1 | 3/2004 | Chang et al. |
| 6,728,317 | B1 | 4/2004 | Demos |

(Continued)

FOREIGN PATENT DOCUMENTS

| EP | 1677545 | 7/2006 |
| EP | 1827024 | 8/2007 |

(Continued)

OTHER PUBLICATIONS

List et al., Adaptive Deblocking Filter, Jul. 2003, IEEE, vol. 13, No. 7.*

(Continued)

*Primary Examiner* — Christopher S Kelley
*Assistant Examiner* — Asmamaw G Tarko
(74) *Attorney, Agent, or Firm* — Robert D. Shedd; Guy H. Eriksen

(57) ABSTRACT

Apparatus and methods are described for encoding and decoding an enhancement layer. A deblocking filter is applied at the enhancement layer for bit depth scalability. The deblocking filter is adjusted to remove coding artifacts caused by local inverse tone mapping for intra-layer texture prediction for the bit depth scalability. The boundary strength of the deblocking filter is adjusted based on a threshold that, in turn, is based on a difference of inverse tone mapping parameters for a block and an adjacent block.

14 Claims, 9 Drawing Sheets

U.S. PATENT DOCUMENTS

| | | | |
|---|---|---|---|
| 6,803,922 | B2 | 10/2004 | Marino |
| 6,804,403 | B1 | 10/2004 | Wang et al. |
| 7,003,166 | B2 | 2/2006 | Abhyankar et al. |
| 7,064,873 | B2 | 6/2006 | Lapstun et al. |
| 7,079,690 | B2 | 7/2006 | Boliek et al. |
| 7,136,062 | B1 | 11/2006 | Butler |
| 7,206,451 | B2 | 4/2007 | Chui et al. |
| 7,209,599 | B2 | 4/2007 | Simske et al. |
| 7,280,702 | B2 | 10/2007 | Chang et al. |
| 7,308,146 | B2 | 12/2007 | Becker et al. |
| 7,324,695 | B2 | 1/2008 | Krishnan et al. |
| 7,339,595 | B2 | 3/2008 | Hilliard et al. |
| 7,376,279 | B2 | 5/2008 | Dekel et al. |
| 7,421,129 | B2 | 9/2008 | Lee et al. |
| 7,792,195 | B2 | 9/2010 | Xue et al. |
| 7,983,496 | B2 | 7/2011 | Liu et al. |
| 8,014,613 | B2 | 9/2011 | Segall |
| 8,085,852 | B2 | 12/2011 | Liu et al. |
| 2004/0086176 | A1 | 5/2004 | Meier et al. |
| 2004/0156433 | A1* | 8/2004 | Comer et al. ............... 375/240.2 |
| 2005/0024651 | A1 | 2/2005 | Yu et al. |
| 2005/0163388 | A1 | 7/2005 | Schwartz et al. |
| 2005/0196066 | A1 | 9/2005 | Kim et al. |
| 2005/0265442 | A1* | 12/2005 | Kim ............................ 375/240.1 |
| 2005/0271283 | A1 | 12/2005 | Dekel et al. |
| 2006/0126962 | A1 | 6/2006 | Sun |
| 2006/0146941 | A1 | 7/2006 | Cha et al. |
| 2006/0197777 | A1* | 9/2006 | Cha et al. ....................... 345/600 |
| 2007/0147686 | A1 | 6/2007 | Joshi |
| 2007/0201560 | A1 | 8/2007 | Segall et al. |
| 2009/0003718 | A1* | 1/2009 | Liu et al. ......................... 382/238 |
| 2009/0110073 | A1* | 4/2009 | Wu et al. ................... 375/240.15 |
| 2009/0285283 | A1* | 11/2009 | Gao et al. .................. 375/240.08 |
| 2009/0323804 | A1* | 12/2009 | Gao et al. .................. 375/240.02 |
| 2010/0008418 | A1* | 1/2010 | Wu et al. ................... 375/240.12 |
| 2010/0027619 | A1* | 2/2010 | Doser et al. ............... 375/240.02 |
| 2010/0046622 | A1* | 2/2010 | Doser et al. ............... 375/240.13 |
| 2010/0091840 | A1* | 4/2010 | Gao et al. .................... 375/240.2 |
| 2010/0111167 | A1* | 5/2010 | Wu et al. ................... 375/240.12 |
| 2010/0128786 | A1* | 5/2010 | Gao et al. ................... 375/240.13 |
| 2010/0135393 | A1* | 6/2010 | Ying Gao et al. ........ 375/240.15 |
| 2010/0142836 | A1 | 6/2010 | Joshi et al. |
| 2010/0220789 | A1* | 9/2010 | Yuwen et al. ............ 375/240.16 |
| 2010/0220795 | A1 | 9/2010 | Yin et al. |
| 2011/0091119 | A1 | 4/2011 | Fukuhara et al. |
| 2011/0091130 | A1 | 4/2011 | Faubert et al. |
| 2011/0255796 | A1 | 10/2011 | Nakamura et al. |
| 2011/0293003 | A1* | 12/2011 | Luo et al. .................. 375/240.12 |

FOREIGN PATENT DOCUMENTS

| | | |
|---|---|---|
| JP | 2004-180248 | 6/2004 |
| JP | 2006-191576 | 7/2006 |
| JP | 2006-246473 | 9/2006 |
| JP | 2007-243942 | 9/2007 |
| JP | 2011-501561 | 1/2011 |
| WO | WO2009000110 | 12/2008 |
| WO | WO2009003499 | 1/2009 |

OTHER PUBLICATIONS

Schwarz et al., Constrained Inter-Layer Prediction for Single-Loop Decoding in Spatial Scalability, 2005, IEEE.*

Gao et al., Applications and Requirement for Color Birt Depth Scalability, JVT-U049, Oct. 2006.*

Wu et al., Bit-Depth scalability compatible to H.264/AVC-scalable extension, 2008, J. Vis Commun. Image R. 19, 372-381.*

ITU-T_H.264.: "Series H: Audiovisual and Multimedia Systems Infrastructure of Audiovisual Services-Coding of Moving Video," Advanced Video coding for generic audiovisual services, Mar. 2005, pp. 1-343.

Segall et al.: "Tone Mapping SEI Message," Joint Video Team of ISO/IEC MPEG & ITU-T VCEG, Doc. JVT-T060, Jul. 17, 2006, pp. 1-13.

Gao et al.: "Applications and Requirement for Color Bit Depth Scalability," Joint Video Team of ISO/IEC MPEG & ITU-T VCEG, Doc. JVT-U049, Oct. 20, 2006, pp. 1-10.

Gao et al.: "Simulation Results for CE2:SVC Bit-depth Scalability," Joint Video Team of ISO/IEC MPEG & ITU-T, Doc. JVT-X051, Jun. 29, 2007, pp. 1-13.

Wu et al.: "Study on Inter-layer Prediction in Bit-deph Scalability," Joint Video Team of ISO/IEC MPEG & ITU-T VCEG, doc. JVT-X052, Jun. 29, 2007, pp. 1-13.

Winken et al.: "CE2: SVC bit-depth Scalable Coding," Joint Video Team of ISO/IEC MPEG & ITU-T VCEG, doc. JVTX057, Jun. 29, 2007, pp. 1-15.

Segall et al.: "CE2: Inter-layer Prediction for Bit-depth Scalable Coding," Joint Video Team of ISO/IEC MPEG & ITU-T VCEG, doc. JVT-X067, Jun. 29, 2007, pp. 1-7.

Vetro et al.: "Joint Draft 4.0 on Multiview Video Coding," Joint Video Team of ISO/IEC & MPEG & ITU-T VCEG, Doc. JVT-X209, Jun. 29, 2007, pp. 1-34.

Wu et al.: "Bit-depth Scalability Compatible to H.264/AVC-Scalable Extension," Journal of Visual Communication and Image Representation, vol. 19, No. 6, Aug. 1, 2008, pp. 372-381.

Wiegand et al.: "Meeting Report of the 24th JVT Meeting (Jun. 29-Jul. 5, 2007, Geneva, CH)," Joint Video Team of ISO/IEC MPEG & ITU-T VCEG, doc. JVT-X200, Jun. 29, 2007, pp. 1-80.

Segall et al.: "System for Bit-Depth Scalable Coding," Joint Video Team of ISO/IEC MPEG & ITU-T VCEG, Doc. JVT-W113, Apr. 21, 2007, pp. 1-7.

Park et al.: "Bit-Depth Scalable Video Coding Based on H.264/AVC," IEICE Trans Fundamentals, vol. E91-A, No. 6, Jun. 1, 2008, pp. 1541-1544.

Liu et al.: "Inter-layer Prediction for SVC Bit-depth Scalability," Joint Video Team of ISO/IEC MPEG & ITU-T VCEG, Doc. JVT-X075, Jun. 29, 2007, p. 1-12.

Wiegand et al.: "Joint Draft 8 of SVC Amendment," Joint Video Team of ISO/IEC MPEG & ITU-T VCEG, Doc. JVT-U201, Oct. 20, 2006, pp. 1-227.

Schwarz et al., "Constrained Inter-Layer Prediction for Single-Loop Decoding in Spatial Scalability", Proc. of IEEE ICIP2005, Genova, Italy, Sep. 11-14, 2005.

PCT Search Report dated: Mar. 23, 2009.

Winken, M. et al., "Bit-Depth Scalable Video Coding", Proc. IEEE International Conference on Image Processing, pp. 5-8, Sep. 16-19, 2007, Section 2 and Section 3, Fig. 1.

Winken, M. et al., "SVC Bit Depth Scalability", Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, Document: JVT-V078, ITU-T, Jan. 2007.

* cited by examiner

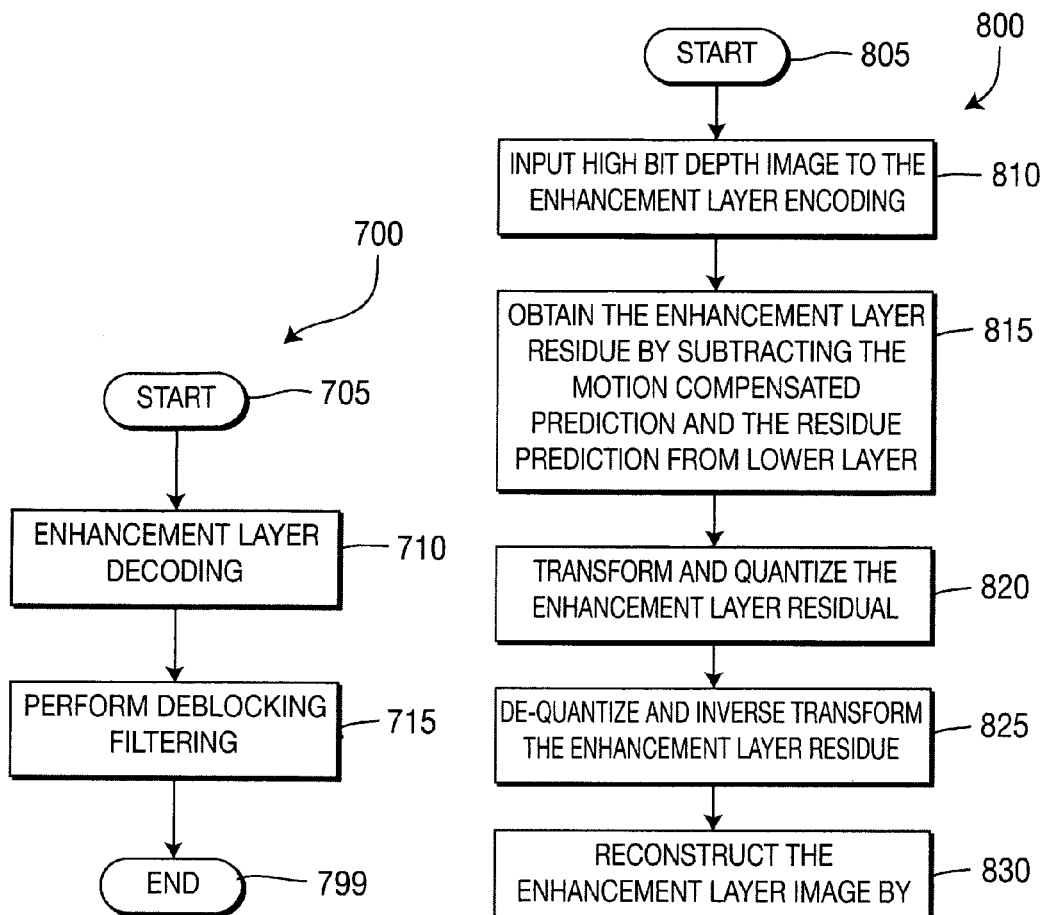

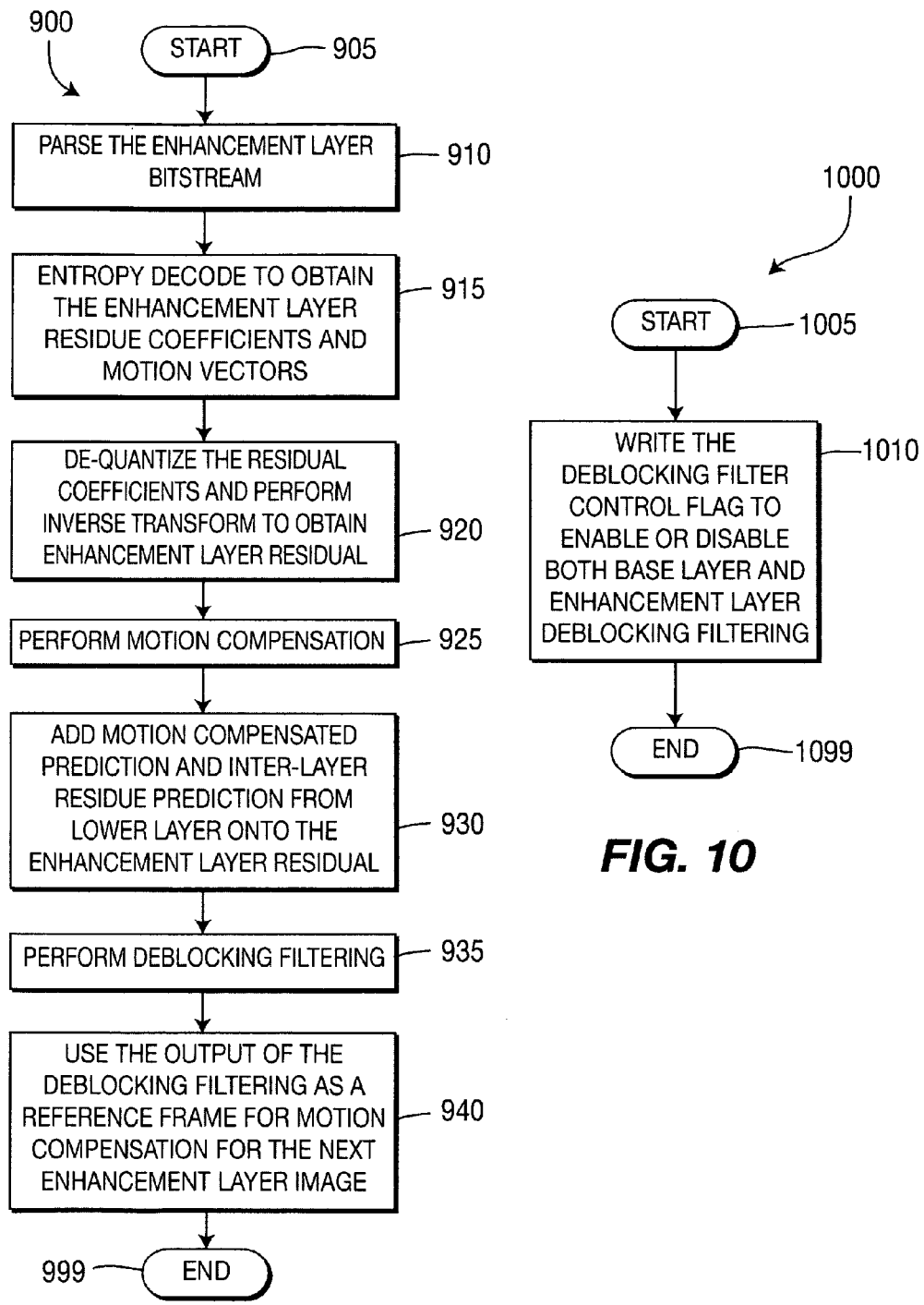

METHODS AND APPARATUS FOR ARTIFACT REMOVAL FOR BIT DEPTH SCALABILITY

CROSS-REFERENCE TO RELATED APPLICATIONS

This application claims the benefit, under 35 U.S.C. §365 of International Application PCT/US2008/011708 filed Oct. 14, 2008, which was published in accordance with PCT Article 21(2) on Apr. 23, 2009, in English, and which claims the benefit of U.S. Provisional Patent Application No. 60/980,322, filed on Oct. 16, 2007, in English, which are incorporated by reference in their respective entireties. Further, this application is related to the non-provisional application, Ser. No. 12/734,206, entitled "METHODS AND APPARATUS FOR ARTIFACT REMOVAL FOR BIT DEPTH SCALABILITY", which also claims the benefit of U.S. Provisional Application Ser. No. 60/980,322, filed Oct. 16, 2007.

TECHNICAL FIELD

The present principles relate generally to video encoding and decoding and, more particularly, to methods and apparatus for artifact removal for bit depth scalability.

BACKGROUND

Bit depth refers to the number of bits used to hold a pixel. Sometimes also referred to as "color depth" and/or "pixel depth", bit depth determines the maximum number of colors that can be displayed at one time. In recent years, digital images and digital videos (hereinafter collectively referred to as "digital images") with a bit depth greater than eight are more and more desirable in many application fields, including, but not limited to, medical image processing, digital cinema workflows in production and postproduction, and home theatre related applications.

Bit-depth scalability is potentially useful regarding the fact that at some time in the future, conventional eight bit depth and high bit depth digital imaging systems will simultaneously exist in marketplaces.

There are several ways to handle the coexistence of an 8-bit video and a 10-bit video. In a first solution, only a 10-bit coded bit-stream is transmitted and the 8-bit representation for standard 8-bit display devices is obtained by applying tone mapping methods to the 10-bit presentation. Tone mapping is a well-known technique to convert a higher bit depth to a lower bit depth, often to approximate the appearance of high dynamic range images in media with a more limited dynamic range. In a second solution, a simulcast bit-stream that includes an 8-bit coded presentation and 10-bit coded presentation is transmitted. It is the decoder's preference to choose which bit-depth to decode. For example, a 10-bit capable decoder can decode and output a 10-bit video while a normal decoder supporting only 8-bit video can just output an 8-bit video. The first solution is inherently incompliant with the 8-bit profiles of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"). The second solution is compliant to all the current standards but requires more overhead.

SUMMARY

These and other drawbacks and disadvantages of the prior art are addressed by the present principles, which are directed to methods and apparatus for artifact removal for bit depth scalability.

According to an aspect of the present principles, there is provided an apparatus. The apparatus includes an encoder for encoding an enhancement layer for at least a portion of a picture. A deblocking filter is applied at the enhancement layer for bit depth scalability.

According to yet another aspect of the present principles, there is provided a method. The method includes encoding an enhancement layer for at least a portion of a picture. The encoding step includes applying deblocking filtering at the enhancement layer for bit depth scalability.

According to still another aspect of the present principles, there is provided an apparatus. The apparatus includes a decoder for decoding an enhancement layer for at least a portion of a picture. A deblocking filter is applied at the enhancement layer for bit depth scalability.

According to still yet another aspect of the present principles, there is provided a method. The method includes decoding an enhancement layer for at least a portion of a picture. The decoding step includes applying deblocking filtering at the enhancement layer for bit depth scalability.

According to a further aspect of the present principles, there is provided an apparatus. The apparatus includes an encoder for encoding image data for at least one block of a picture. A deblocking filter removes coding artifacts caused by local inverse tone mapping for intra-layer texture prediction for bit depth scalability.

According to a still further aspect of the present principles, there is provided a method. The method includes encoding image data for at least one block of a picture. The encoding step includes applying deblocking filtering to remove coding artifacts caused by local inverse tone mapping for intra-layer texture prediction for bit depth scalability.

According to a yet further aspect of the present principles, there is provided an apparatus. The apparatus includes a decoder for decoding image data for at least one block of a picture. A deblocking filter removes coding artifacts caused by local inverse tone mapping for intra-layer texture prediction for bit depth scalability.

According to an additional aspect of the present principles, there is provided a method. The method includes decoding image data for at least one block of a picture. The decoding step includes applying deblocking filtering to remove coding artifacts caused by local inverse tone mapping for intra-layer texture prediction for bit depth scalability.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 7 is a flow diagram for an exemplary video decoding method using a deblocking filter as a post filter, in accordance with an embodiment of the present principles;

FIG. 8 is a flow diagram for an exemplary video encoding method using a deblocking filter as an in-loop filter, in accordance with an embodiment of the present principles;

FIG. 9 is a flow diagram for an exemplary video decoding method using a deblocking filter as an in-loop filter, in accordance with an embodiment of the present principles;

FIG. 10 is a flow diagram for an exemplary video encoding method capable of jointly enabling or disabling deblocking filters on the base layer and an enhancement layer, in accordance with an embodiment of the present principles;

DETAILED DESCRIPTION

Figure 1:
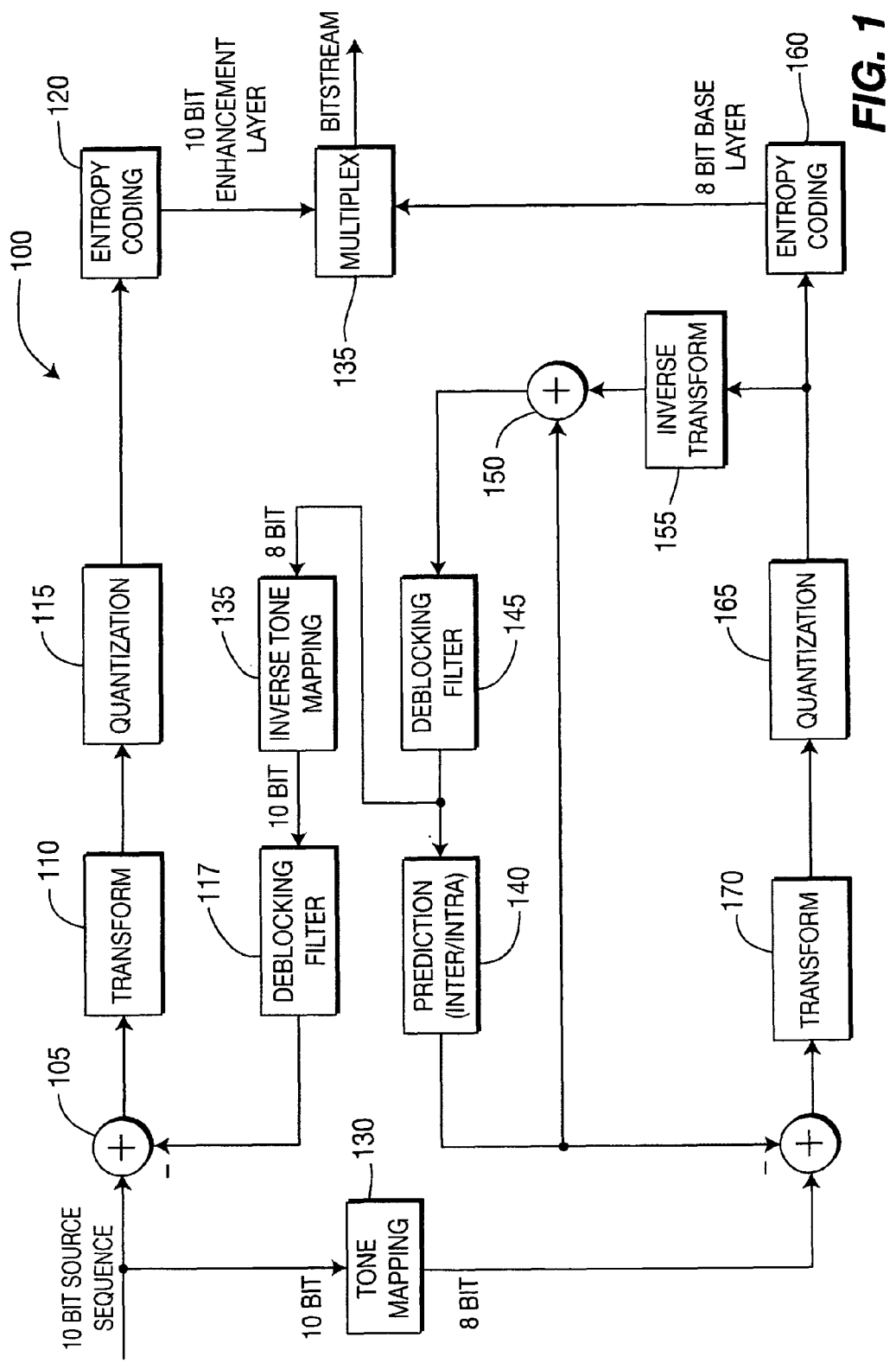
FIG. 1 is a block diagram for an exemplary bit depth scalable encoder to which the present principles may be applied, in accordance with an embodiment of the present principles.

The present principles are directed to methods and apparatus for artifact removal for bit depth scalability.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the scalable extension of the MPEG-4 AVC Standard, also known as and interchangeably referred to herein as scalable video coding or SVC, the present principles are not limited to solely the same and, thus, may be utilized with respect to other video coding standards, recommendations, and extensions thereof, while maintaining the spirit of the present principles.

Further, it is to be appreciated that while one or more embodiments of the present principles are described herein with respect to 10-bit video as an illustrative example for high bit video, the present principles are not limited to solely to 10-bit video in this regard and, thus, may be utilized with respect to other bit depths including, but not limited to, 12-bit, 14-bit, 16-bit, and so forth, while maintaining the spirit of the present principles.

With respect to the first solution and the second solution mentioned above with respect to handling the coexistence of 8-bit video and 10-bit video and, in particular, with respect to the deficiencies of the two solutions, an acceptable tradeoff between backward standard compatibility and bit reduction can be a scalable solution. The scalable extension of the MPEG-4 AVC Standard, also known as and interchangeably referred to herein as scalable video coding or SVC, is considering the support of bit-depth scalability.

There are at least three advantages of bit-depth scalable coding over prost-processing or simulcast. A first advantage is that bit-depth scalable coding enables 10-bit video in a backward-compatible manner with High Profiles of the MPEG-4 AVC Standard. A second advantage is that bit-depth scalable coding enables adaptation to different network bandwidths or device capabilities. A third advantage is that bit-depth scalable coding provides low complexity, high efficiency, and high flexibility.

In scalable video coding, single-loop decoding is supported to reduce the decoding complexity. The complete decoding, including motion-compensated prediction and the deblocking of the inter-coded macroblocks, is only required for the current spatial or CGS layer. This is realized by constraining the inter-layer intra texture prediction to those parts of the lower layer picture that are coded with intra macroblocks.

In bit depth scalability, local inverse tone mapping may be applied. A special case of local inverse tone mapping is block/macroblock based inverse tone mapping. If block/macroblock based inverse tone mapping is applied for inter-layer texture prediction, then coding artifacts may nonetheless exist even after deblocking filtering is used in scalable video coding. This is because the current deblocking filter in scalable video coding is designed so as not to consider block/macroblock based inverse tone mapping.

The present principles are directed to bit depth scalability. The present principles provide methods and apparatus for removing coding artifacts, for example, due to local inverse tone mapping (e.g., a special case of local inverse tone mapping is block/macroblock based inverse tone mapping) for bit depth scalability. In an embodiment, we propose to adjust the deblocking filter in scalable video coding for the enhancement layer.

The particular mode related to inter-layer intra texture prediction is called INTRA_BL mode. For deblocking filtering related to INTRA_BL mode, the boundary strength (BS) is adjusted only based on whether or not the block includes non-zero transform coefficients.

In the MPEG-4 AVC Standard, two different frameworks are studied.

The first framework is shown in FIG. 1. Turning to FIG. 1, a bit depth scalable encoder is indicated generally by the reference numeral 100.

The encoder 100 includes a combiner having an output connected in signal communication with an input of a transformer 110. An output of the transformer 110 is connected in signal communication with an input of a quantizer 115. An output of the quantizer 115 is connected in signal communication with an input of an entropy coder 120. An output of the entropy coder 120 is connected in signal communication with a first input of a multiplexer 135, for providing a 10-bit enhancement layer to the multiplexer 135.

An output of a tone mapper 130 is connected in signal communication with a non-inverting input of a combiner 175. An output of the combiner 175 is connected in signal communication with an input of a transformer 170. An output of the transformer 170 is connected in signal communication with an input of a quantizer 165. An output of the quantizer 165 is connected in signal communication with an input of an entropy coder 160 and an input of an inverse transformer 155. An output of the entropy coder 160 is connected in signal communication with a second input of the multiplexer 135, for providing a 8-bit base layer to the multiplexer 135. An output of the inverse transformer 155 is connected in signal communication with a first non-inverting input of a combiner 150. An output of the combiner 150 is connected in signal communication with an input of a deblocking filter 145. An output of the deblocking filter 145 is connected in signal communication with an input of an inverse tone mapper 125 and an input of a predictor 140. An output of the predictor 140 is connected in signal communication with an inverting input of the combiner 175 and a second non-inverting input of the combiner 150.

An output of the inverse tone mapper 125 is connected in signal communication with an input of a deblocking filter 117. An output of the deblocking filter 117 is connected in signal communication with an inverting input of the combiner 105.

An input of the combiner 105 and an input of the tone mapper 130 are available as inputs of the encoder 100, for receiving a 10-bit source sequence. An output of the multiplexer 135 is available as an output of the encoder 100, for outputting a bitstream.

Figure 2:
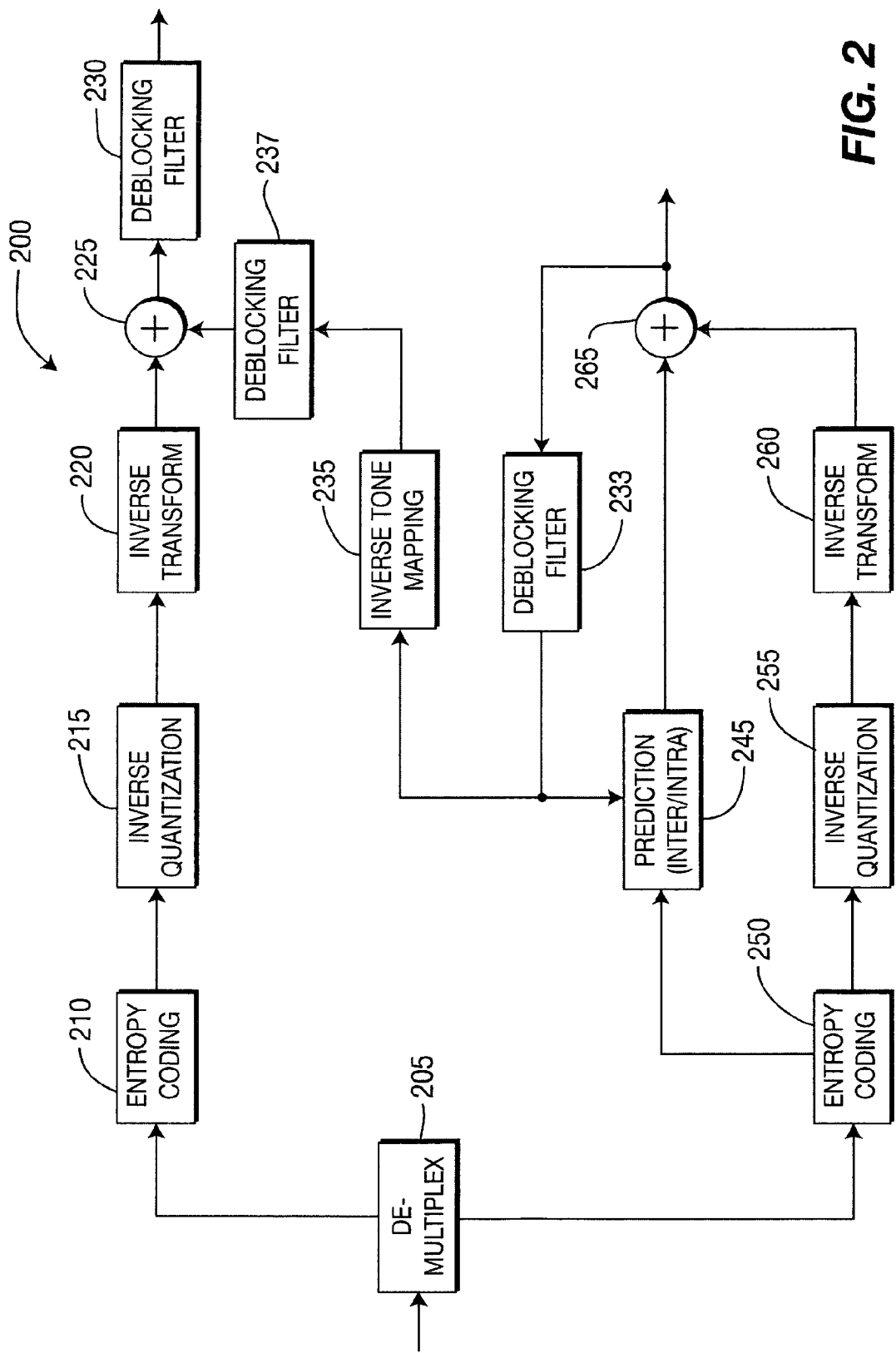
FIG. 2 is a block diagram for an exemplary bit depth scalable decoder to which the present principles may be applied, in accordance with an embodiment of the present principles.

A decoder corresponding to the first framework is shown in FIG. 2. Turning to FIG. 2, a bit depth scalable decoder is indicated generally by the reference numeral 200.

The decoder 200 includes a de-multiplexer 205 having a first output connected in signal communication with an input of an entropy decoder 210. An output of the entropy decoder 210 is connected in signal communication with an input of an inverse quantizer 215. An output of the inverse quantizer 215 is connected in signal communication with an input of an inverse transformer 220. An output of the inverse transformer 220 is connected in signal communication with a first non-inverting input of a combiner 225. An output of the combiner 225 is connected in signal communication with an input of a deblocking filter 230.

A second output of the de-multiplexer 205 is connected in signal communication with an input of an entropy decoder 250. A first output of the entropy decoder 250 is connected in signal communication with an input of an inverse quantizer 255. An output of the inverse quantizer 255 is connected in signal communication with an input of an inverse transformer 160. An output of the inverse transformer 260 is connected in signal communication with a second non-inverting input of a combiner 265. A second output of the entropy decoder 250 is connected in signal communication with a first input of a predictor 245. An output of the predictor 245 is connected in signal communication with a first non-inverting input of the combiner 265.

An output of a deblocking filter 233 is connected in signal communication with an input of an inverse tone mapper 235 and with a second input of the predictor 245. An output of the inverse tone mapper 235 is connected in signal communication with an input of a deblocking filter 237. An output of the deblocking filter 237 is connected in signal communication with a second non-inverting input of the combiner 225.

An input of the de-multiplexer 205 is available as an input of the decoder 200, for receiving a bitstream. An output of the combiner 265 is connected in signal communication with an input of the deblocking filter 233. The output of the combiner 265 is also available as an output of the decoder 200, for outputting pictures.

In the framework relating to encoder 100, the motion compensation loop is performed at the base layer, where INTRA_BL mode is extended to further support bit depth scalability. Inverse tone mapping, which is directed to inverting the tone mapping process that was employed for generating the 8-bit representation out of the 10-bit source signal, is employed. No deblocking filtering is applied at the enhancement layer at encoder. Deblocking filtering, as an optional step, can be applied at post-processing for the enhancement layer by decoder 200. Inverse tone mapping can be signaled globally, or at the macroblock level, where inverse tone mapping parameters, such as a scale factor and an offset value for each macroblock of each color channel, are applied.

Figure 3:
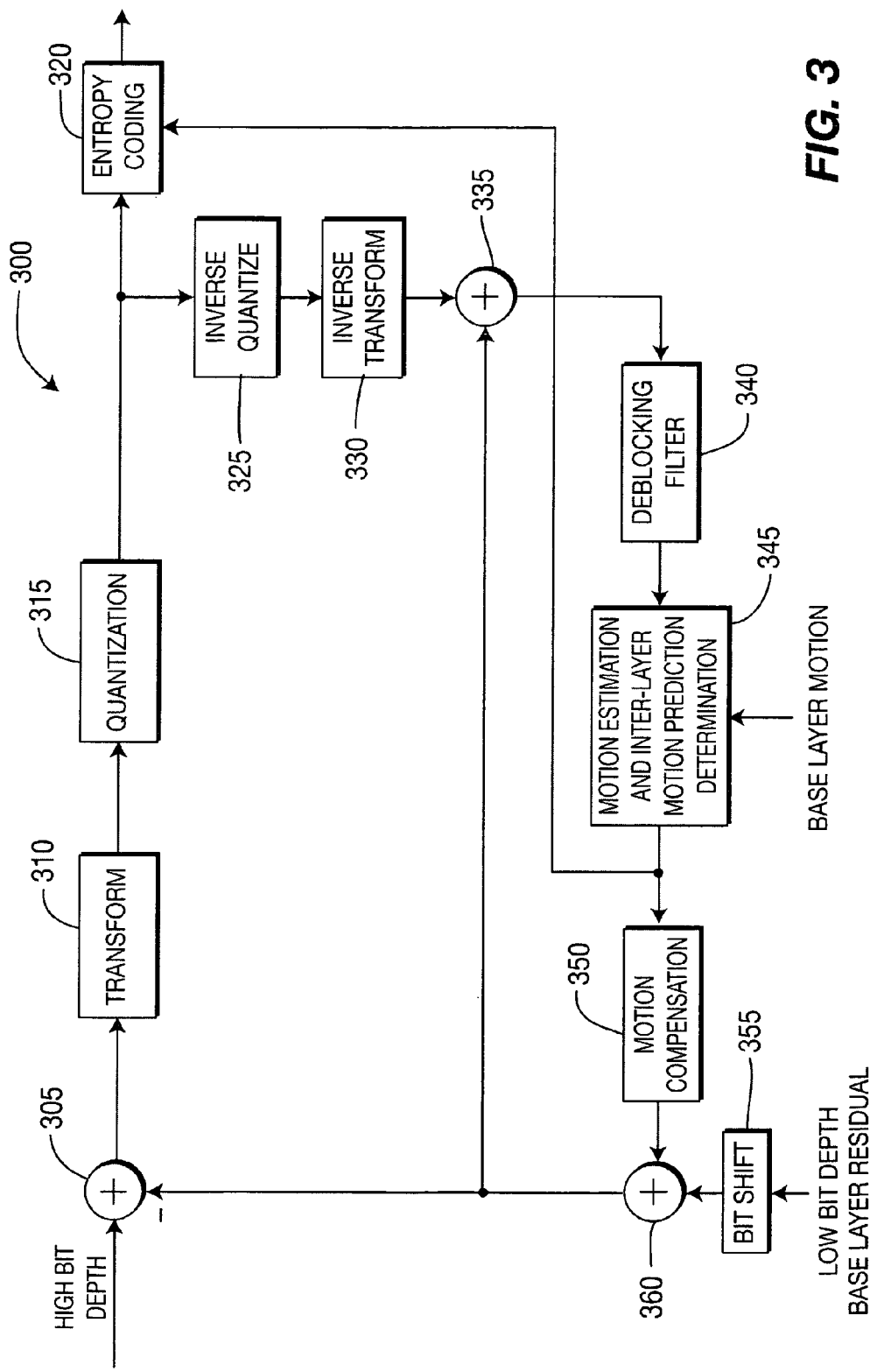
FIG. 3 is a block diagram for another exemplary bit depth scalable encoder to which the present principles may be applied, in accordance with an embodiment of the present principles.

The second framework involves performing motion compensation at the enhancement layer, where the deblocking filter is used but does not take into account local inverse tone mapping. The second framework is shown in FIG. 3. Turning to FIG. 3, another bit depth scalable encoder is indicated generally by the reference numeral 300. The encoder 300 utilizes a simple method of inverse tone mapping referred to as "bit shifting". Bit shifting can be generalized to any inverse tone mapping method.

The encoder 300 includes a combiner 305 having an output connected in signal communication with an input of a transformer 310. An output of the transformer 310 is connected in signal communication with an input of a quantizer 315. An output of the quantizer 315 is connected in signal communication with a first input of an entropy coder 320 and with an input of an inverse quantizer 325. An output of the inverse quantizer 325 is connected in signal communication with an input of an inverse transformer 330. An output of the inverse transformer 330 is connected in signal communication with a first non-inverting input of a combiner 335. An output of the combiner 335 is connected in signal communication with an input of a deblocking filter 340. An output of the deblocking filter 340 is connected in signal communication with a first input of a motion estimator and inter-layer motion prediction determination device 345. An output of the motion estimator and inter-layer motion prediction determination device 345 is connected in signal communication with an input of a motion compensator 350 and a second input of the entropy coder 320. An output of the motion compensator 350 is connected in signal communication with a first non-inverting input of a combiner 360. An output of the combiner 360 is connected in signal communication with an inverting input of the combiner 305.

An output of a bit shifter 355 is connected in signal communication with a second non-inverting input of the combiner 360.

An input of the combiner 305 is available as an input of the encoder 100, for receiving a high bit depth enhancement layer residual. A input of the bit shifter 355 is available as an input of the encoder 100, for receiving a low bit depth base layer residual. A second input of the motion estimator and inter-layer motion prediction determination device 345 is available as an input of the encoder 100, for receiving base layer motion information.

Figure 4:
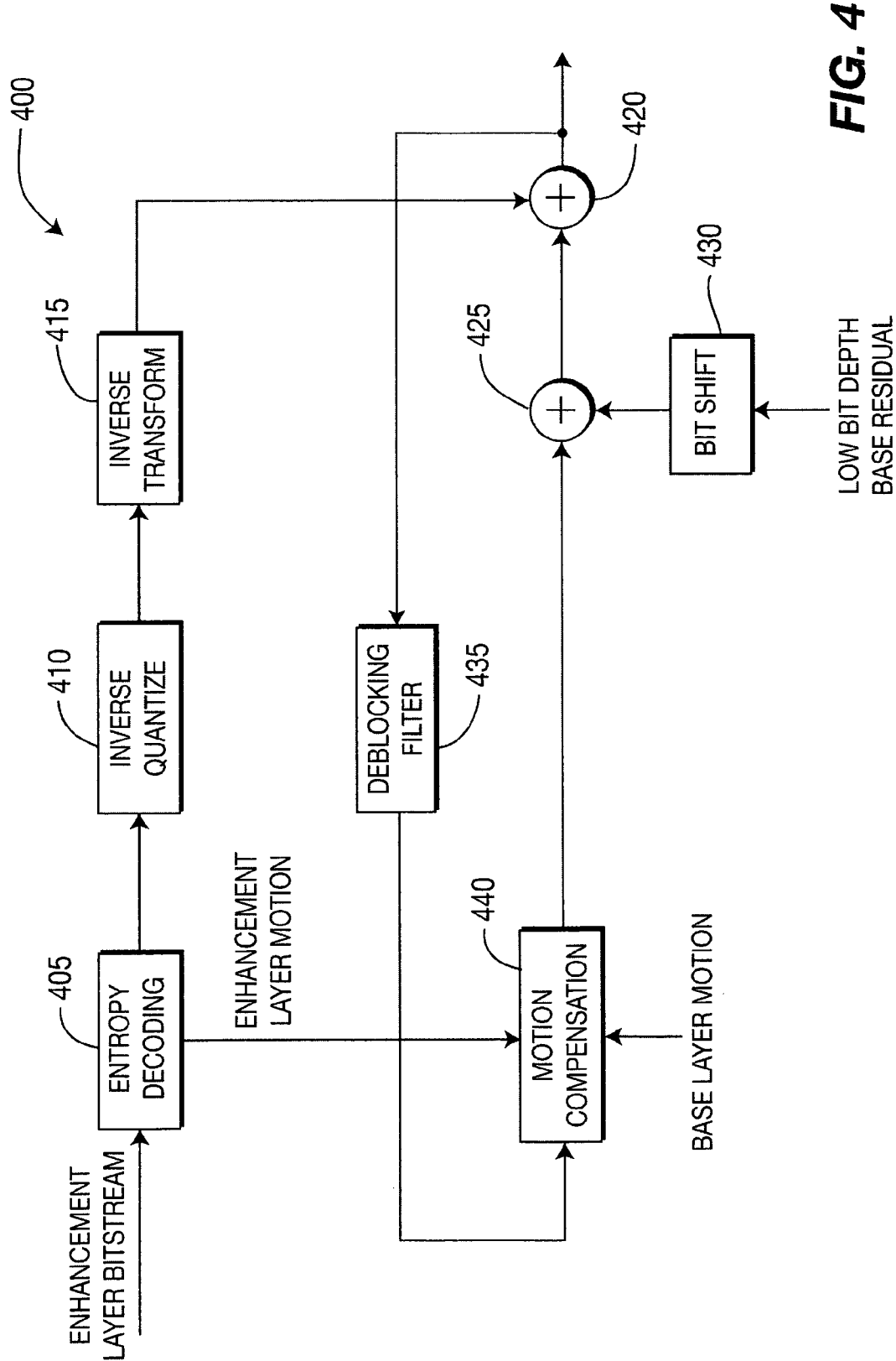
FIG. 4 is a block diagram for another exemplary bit depth scalable decoder to which the present principles may be applied, in accordance with an embodiment of the present principles.

A decoder corresponding to the second framework is shown in FIG. 4. Turning to FIG. 4, another bit depth scalable decoder is indicated generally by the reference numeral 400.

The decoder 400 includes an entropy decoder 405 having a first output connected in signal communication with an input of an inverse quantizer 410. An output of the inverse quantizer 410 is connected in signal communication with an input of an inverse transformer 415. An output of the inverse transformer 415 is connected in signal communication with a first non-inverting input of a combiner 420.

An output of a deblocking filter 445 is connected in signal communication with a first output of a motion compensator 440. An output of the motion compensator 440 is connected in signal communication with a first non-inverting input of a combiner 425. An output of the combiner is connected in signal communication with a second non-inverting input of the combiner 420.

A second output of the entropy decoder 405 is connected in signal communication with a second input of the motion compensator 440.

An output of the combiner 420 is connected in signal communication with an input of the deblocking filter. An output of a bit shifter 430 is connected in signal communication with a second non-inverting input of the combiner 425.

The output of the combiner 420 is also available as an output of the decoder 400, for outputting pictures. An input of the entropy decoder 405 is available as an input of the decoder 400, for receiving an enhancement layer bitstream. A third input of the motion compensator 440 is available as an input of the decoder 400, for receiving base layer motion information. An input of the bit shifter 430 is available as an input of the decoder 400, for receiving a low bit depth base residual.

When macroblock level inverse tone mapping is used, coding artifacts may be observed. Since bit depth scalability is still under development in Joint Video Team (JVT), there is no prior art that specifically addresses coding artifacts caused by macroblock level inverse tone mapping for the enhancement layer.

In accordance with the present principles, coding artifacts caused by local inverse tone mapping ($T^{-1}$) in INTRA_BL mode are removed. In one embodiment for the first framework, we add a deblocking filter 230 to the enhancement layer decoder, as shown in FIG. 2. The deblocking filter 230 is used for post processing. In one embodiment for the second framework, where the deblocking filter 435 is in-loop as shown in FIG. 4, we can adjust the deblocking filter 435 to deal with local inverse tone mapping. The deblocking filter 435 can be a different one than the deblocking filter applied in the base layer. Moreover, both deblocking filters can be individually or jointly switched on and off.

Further, in one particular embodiment, we propose to adjust the deblocking filter by considering macroblock level local inverse tone mapping at the enhancement layer.

In one additional embodiment, we adjust the boundary strength (BS) if both adjacent blocks are INTRA_BL mode and the inverse tone mapping parameters are different, or inverse tone mapping is applied to only one block. The BS is set according to the difference of the inverse tone mapping for adjacent blocks. In one embodiment, we can change the BS as follows:

In the case when the original MPEG-4 AVC Standard boundary conditions for the deblocking filter satisfy BS=0
IF
(1) $T^{-1}$ is applied to both adjacent blocks & their parameters are not same OR
(2) $T^{-1}$ is applied to only ONE block (the other block is not coded by INTRA_BL mode)

| | |
|---|---|
| IF difference of $T^1$ >= threshold | SET BS = K2 (strong deblocking) |
| ELSE | SET BS = K1 ( weak deblocking) |
| OTHERWISE | SET BS = 0 |

Of course, the present principles are not limited solely to the preceding approach for changing the BS and, thus, other approaches to changing the BS may also be employed in accordance with the present principles, while maintaining the spirit of the present principles.

Figure 5:
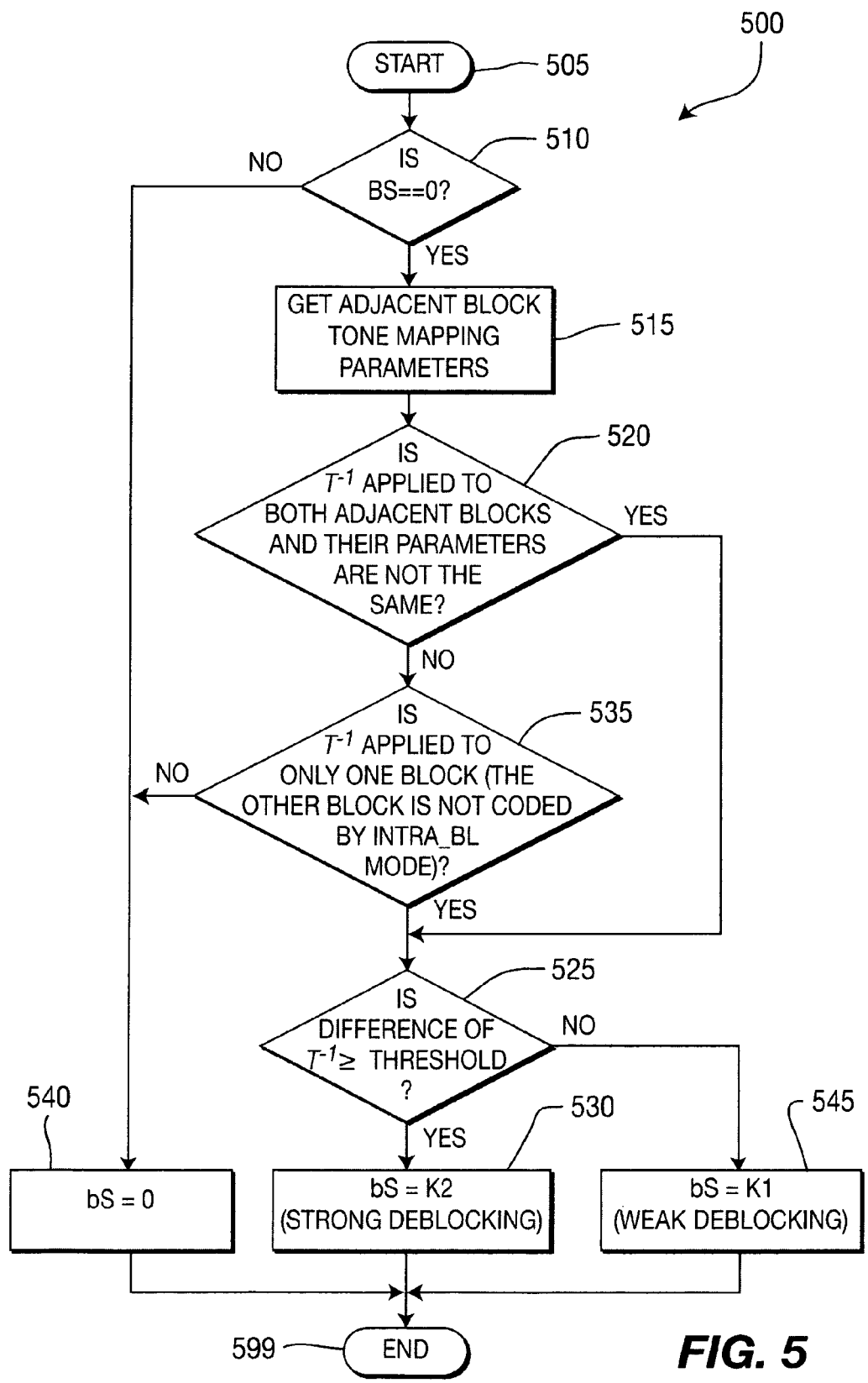
FIG. 5 is a flow diagram for an exemplary method for deblocking filtering to remove coding artifacts in bit depth scalability, in accordance with an embodiment of the present principles.

Turning to FIG. 5, an exemplary method for deblocking filtering to remove coding artifacts in bit depth scalability is indicated generally by the reference numeral 500.

The method 500 includes a start block 505 that passes control to a decision block 510. The decision block 510 determines whether or not BS is equal to zero. If so, then control is passed to a function block 515. Otherwise, control is passed to a function block 540.

The function block 515 gets the adjacent block tone mapping parameters, and passes control to a decision block 520. The decision block 520 determines whether or not local inverse tone mapping ($T^{-1}$) is applied to both adjacent blocks and their parameters are not the same. If so, the control is passed to a decision block 625. Otherwise, control is passed to a function block 535.

The function block 525 determines whether or not the difference of $T^{-1}$ is less than a threshold. If so, then control is passed to a function block 530. Otherwise, control is passed to a function block 545.

The function 530 sets BS equal to a constant K2 (strong deblocking), and passes control to an end block 599.

The decision block 535 determines whether or not $T^{-1}$ is applied to only one block (the other block is not coded by INTRA_BL mode). If so, then control is passed to the function block 525. Otherwise, control is passed to a function block 540.

The function block 540 sets BS equal to zero, and passes control to the end block 599.

The function block 545 sets BS equal to a constant K1 (weak deblocking), and passes control to the end block 599.

Figure 6:
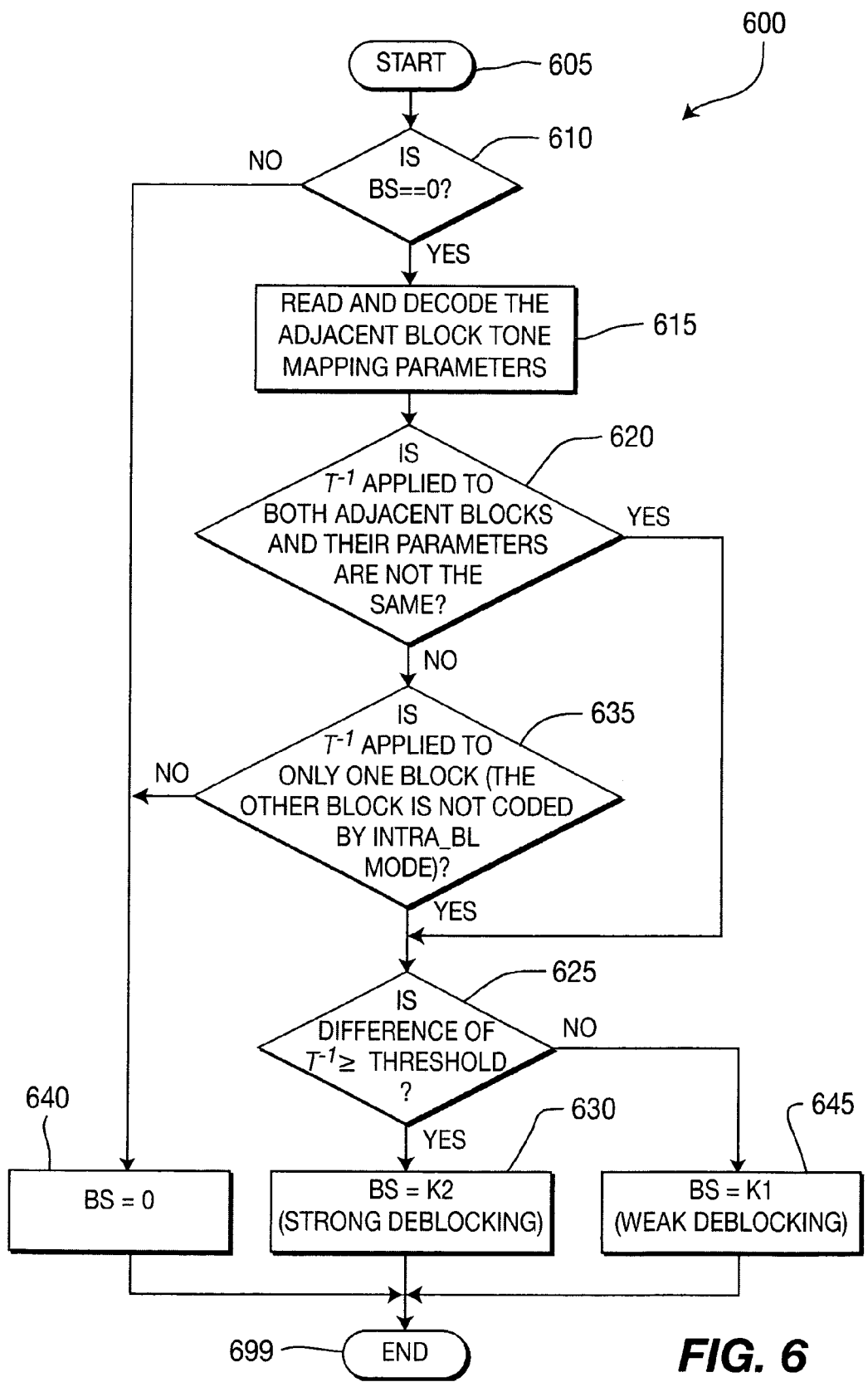
FIG. 6 is a flow diagram for another exemplary method for deblocking filtering to remove coding artifacts in bit depth scalability, in accordance with an embodiment of the present principles.

Turning to FIG. 6, another exemplary method for deblocking filtering to remove coding artifacts in bit depth scalability is indicated generally by the reference numeral 600.

The method 600 includes a start block 605 that passes control to a decision block 610. The decision block 610 determines whether or not BS is equal to zero. If so, then control is passed to a function block 615. Otherwise, control is passed to a function block 640.

The function block 615 reads and decodes the adjacent block tone mapping parameters, and passes control to a decision block 620. The decision block 620 determines whether or not local inverse tone mapping ($T^{-1}$) is applied to both adjacent blocks and their parameters are not the same. If so, the control is passed to a decision block 625. Otherwise, control is passed to a function block 635.

The function block 625 determines whether or not the difference of $T^{-1}$ is less than a threshold. If so, then control is passed to a function block 630. Otherwise, control is passed to a function block 645.

The function 630 sets BS equal to a constant K2 (strong deblocking), and passes control to an end block 699.

The decision block 635 determines whether or not $T^{-1}$ is applied to only one block (the other block is not coded by INTRA_BL mode). If so, then control is passed to the function block 625. Otherwise, control is passed to a function block 640.

The function block 640 sets BS equal to zero, and passes control to the end block 699.

The function block 645 sets BS equal to a constant K1 (weak deblocking), and passes control to the end block 699.

Turning to FIG. 7, an exemplary video decoding method using a deblocking filter as a post filter is indicated generally by the reference numeral 700.

The method 700 includes a start block 705 that passes control to a function block 710. The function block 710 performs enhancement layer decoding, and passes control to a function block 715. The function block 715 performs deblocking filtering, and passes control to an end block 799.

Turning to FIG. 8, an exemplary video encoding method using a deblocking filter as an in-loop filter is indicated generally by the reference numeral 800.

The method 800 includes a start block 805 that passes control to a function block 810. The function block 810 inputs a high bit depth image to the enhancement layer encoding, and passes control to a function block 815. The function block 815 obtains the enhancement layer residue by subtracting the motion compensated prediction and the residue from a lower layer, and passes control to a function block 820. The function block 820 transforms and quantizes the enhancement layer residual, and passes control to a function block 825. The function block 825 de-quantizes and inverse transforms the enhancement layer residue, and passes control to a function block 8330. The function block 830 reconstructs the enhancement layer image by adding the motion compensated prediction and residue prediction from a lower layer onto the reconstructed residue, and passes control to a function block 835. The function block 835 performs deblocking filtering, and passes control to a function block 840. The function block 840 uses the output of the deblocking filter as a reference frame for motion estimation and compensation for the next enhancement layer image, and passes control to an end block 899.

Turning to FIG. 9, an exemplary video decoding method using a deblocking filter as an in-loop filter is indicated generally by the reference numeral 900.

The method 900 includes a start block 905 that passes control to a function block 910. The function block 910 parses the enhancement layer bitstream, and passes control to a function block 915. The function block 915 entropy decodes to obtain the enhancement layer residue coefficients and motion vectors, and passes control to a function block 920. The function block 920 de-quantizes the residual coefficients and performs inverse transformation to obtain the enhancement layer residual, and passes control to a function block 925. The function block 925 performs motion compensation, and passes control to a function block 930. The function block 930 adds the motion compensated prediction and the inter-layer residue prediction from a lower layer onto the enhancement layer residual, and passes control to a function block 935. The function block 935 performs deblocking filtering, and passes control to a function block 940. The function block 940 uses the output of the deblocking filtering as a reference frame for motion compensation for the next enhancement layer image, and passes control to an end block 999.

Turning to FIG. 10, an exemplary video encoding method capable of jointly enabling or disabling deblocking filters on the base layer and an enhancement layer is indicated generally by the reference numeral 1000.

The method 1000 includes a start block 1005 that passes control to a function block 1010. The function block 1010 writes the deblocking filter control flag to enable or disable both base layer and enhancement layer deblocking filtering, and passes control to an end block 1099.

Figure 11:
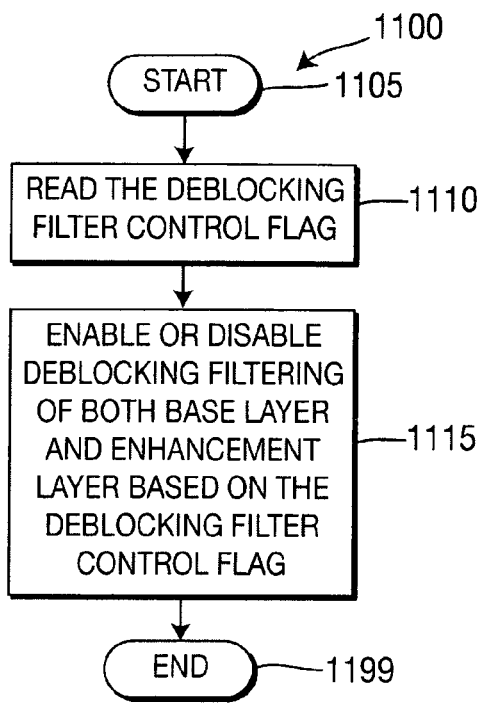
FIG. 11 is a flow diagram for an exemplary video decoding method capable of jointly enabling or disabling deblocking filters on the base layer and an enhancement layer, in accordance with an embodiment of the present principles.

Turning to FIG. 11, an exemplary video decoding method capable of jointly enabling or disabling deblocking filters on the base layer and an enhancement layer is indicated generally by the reference numeral 1100.

The method 1100 includes a start block 1105 that passes control to a function block 1110. The function block 1110 reads the deblocking filter control flag, and passes control to a function block 1115. The function block 1115 enables or disables deblocking filtering of both the base layer and an enhancement layer based on the deblocking filter control flag, and passes control to an end block 1199.

Figure 12:
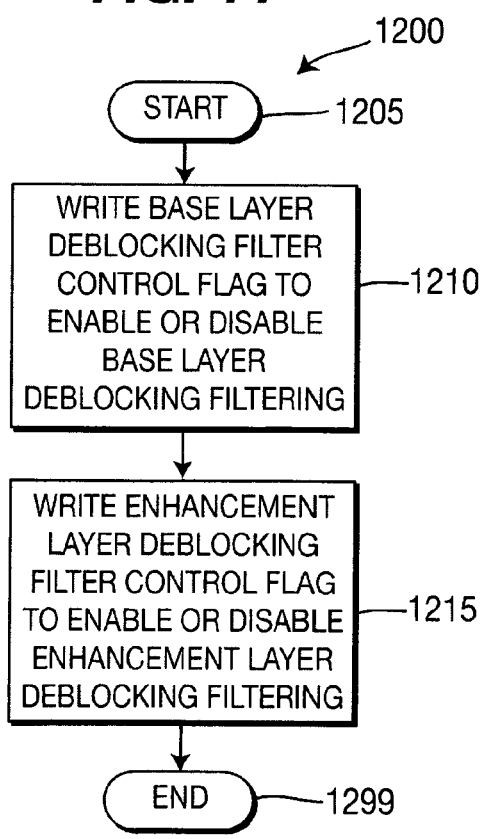
FIG. 12 is a flow diagram for an exemplary video encoding method capable of individually enabling or disabling deblocking filters on the base layer and an enhancement layer, in accordance with an embodiment of the present principles.

Turning to FIG. 12, an exemplary video encoding method capable of individually enabling or disabling deblocking filters on the base layer and an enhancement layer is indicated generally by the reference numeral 1200.

The method 1200 includes a start block 1205 that passes control to a function block 1210. The function block 1210 writes the base layer deblocking filter control flag to enable or disable base layer deblocking filtering, and passes control to a function block 1215. The function block 1215 writes the enhancement layer deblocking filter control flag to enable or disable the enhancement layer deblocking filter, and passes control to an end block 1299.

Figure 13:
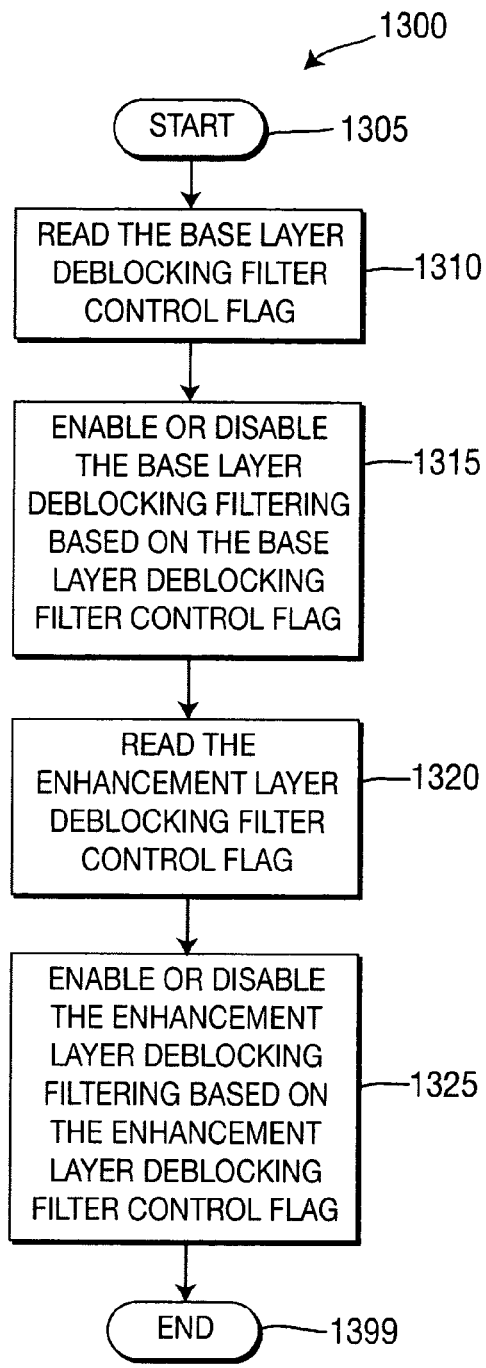
FIG. 13 is a flow diagram for an exemplary video decoding method capable of individually enabling or disabling deblocking filters on the base layer and an enhancement layer, in accordance with an embodiment of the present principles.

Turning to FIG. 13, an exemplary video decoding method capable of individually enabling or disabling deblocking filters on the base layer and an enhancement layer is indicated generally by the reference numeral 1300.

The method 1300 includes a start block 1305 that passes control to a function block 1310. The function block 1310 reads the base layer deblocking filter control flag, and passes control to a function block 1315. The function block 1315 enables or disables the base layer deblocking filtering based on the base layer deblocking filter control flag, and passes control to a function block 1320. The function block 1320 reads the enhancement layer deblocking filter control flag, and passes control to a function block 1325. The function block 1325 enables or disables the enhancement layer deblocking filtering based on the enhancement layer deblocking filter control flag, and passes control to an end block 1399.

A description will now be given of some of the many attendant advantages/features of the present invention, some of which have been mentioned above. For example, one advantage/feature is an apparatus having an encoder for encoding an enhancement layer for at least a portion of a picture. A deblocking filter is applied at the enhancement layer for bit depth scalability.

Another advantage/feature is the apparatus having the encoder as described above, wherein the deblocking filter is adjusted to remove coding artifacts caused by local inverse tone mapping for intra-layer texture prediction for the bit depth scalability.

Yet another advantage/feature is the apparatus having the encoder wherein the deblocking filter is adjusted to remove coding artifacts as described above, wherein the local inverse tone mapping is block-based, and a block size of the block-based local inverse tone mapping is capable of being a macroblock size.

Still another advantage/feature is the apparatus having the encoder wherein the local inverse tone mapping is block-based as described above, wherein a boundary strength of the deblocking filter is adjusted based on a threshold that, in turn, is based on a difference of inverse tone mapping parameters for the at least one block and at least one adjacent block with respect to the at least one block.

Moreover, another advantage/feature is the apparatus having the encoder wherein the deblocking filter is adjusted to remove coding artifacts as described above, wherein a boundary strength of the deblocking filter is adjusted when macroblock-based inverse tone mapping is used for at least one adjacent block with respect to the at least one block or when inverse tone mapping parameters are different for the at least one block and at least one adjacent block with respect to the at least one block.

Further, another advantage/feature is the apparatus having the encoder as described above, wherein the encoder also encodes a base layer for the at least a portion of the picture, and the deblocking filter is capable of being individually or jointly applied or not at the enhancement layer and at the base layer.

Also, another advantage/feature is an apparatus having an encoder for encoding image data for at least one block of a picture. A deblocking filter removes coding artifacts caused by local inverse tone mapping for intra-layer texture prediction for bit depth scalability.

Additionally, another advantage/feature is the apparatus having the encoder as described above, wherein the local inverse tone mapping is block-based, and a block size of the block-based local inverse tone mapping is capable of being a macroblock.

Moreover, another advantage/feature is the apparatus having the encoder wherein the local inverse tone mapping is block-based as described above, wherein a boundary strength of the deblocking filter is adjusted based on a threshold that, in turn, is based on a difference of inverse tone mapping parameters for the at least one block and at least one adjacent block with respect to the at least one block.

Further, another advantage/feature is the apparatus having the encoder as described above, wherein a boundary strength of the deblocking filter is adjusted when macroblock-based inverse tone mapping is used for at least one adjacent block with respect to the at least one block.

Also, another advantage/feature is the apparatus having the encoder as described above, wherein a boundary strength of the deblocking filter is adjusted when inverse tone mapping parameters are different for the at least one block and at least one adjacent block with respect to the at least one block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/ output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding an enhancement layer for at least a portion of a picture, wherein a deblocking filter is applied at the enhancement layer for bit depth scalability,
wherein the deblocking filter is adjusted to remove coding artifacts caused by local inverse tone mapping for intra-layer texture prediction for the bit depth scalability,
wherein the local inverse tone mapping is block-based, and
wherein a boundary strength of the deblocking filter is adjusted based on a threshold that, in turn, is based on a difference of inverse tone mapping parameters for the at least one block and at least one adjacent block with respect to the at least one block.

2. A method, comprising:
encoding an enhancement layer for at least a portion of a picture, wherein said encoding step comprising applying deblocking filtering at the enhancement layer for bit depth scalability,
wherein the deblocking filtering is adjusted to remove coding artifacts caused by local inverse tone mapping for intra-layer texture prediction for the bit depth scalability,
wherein the local inverse tone mapping is block-based, and
wherein a boundary strength of the deblocking filtering is adjusted based on a threshold that, in turn, is based on a difference of inverse tone mapping parameters for the at least one block and at least one adjacent block with respect to the at least one block.

3. An apparatus, comprising:
a decoder for decoding an enhancement layer for at least a portion of a picture, wherein a deblocking filter is applied at the enhancement layer for bit depth scalability,
wherein the deblocking filter is adjusted to remove coding artifacts caused by local inverse tone mapping for intra-layer texture prediction for the bit depth scalability,
wherein the local inverse tone mapping is block-based, and
wherein a boundary strength of the deblocking filter is adjusted based on a threshold that, in turn, is based on a difference of inverse tone mapping parameters for the at least one block and at least one adjacent block with respect to the at least one block.

4. A method, comprising:
decoding an enhancement layer for at least a portion of a picture, wherein said decoding step comprises applying deblocking filtering at the enhancement layer for bit depth scalability,
wherein the deblocking filtering is adjusted to remove coding artifacts caused by local inverse tone mapping for intra-layer texture prediction for the bit depth scalability,
wherein the local inverse tone mapping is block-based, and
wherein a boundary strength of the deblocking filtering is adjusted based on a threshold that, in turn, is based on a difference of inverse tone mapping parameters for the at least one block and at least one adjacent block with respect to the at least one block.

5. A non-transitory computer-readable storage media having video signal data encoded thereupon, comprising:
an enhancement layer encoded for at least a portion of a picture, wherein the enhancement layer is deblocking filtered for bit depth scalability,
wherein the deblocking filtering is adjusted to remove coding artifacts caused by local inverse tone mapping for intra-layer texture prediction for the bit depth scalability,
wherein the local inverse tone mapping is block-based, and
wherein a boundary strength of the deblocking filtering is adjusted based on a threshold that, in turn, is based on a difference of inverse tone mapping parameters for the at least one block and at least one adjacent block with respect to the at least one block.

6. The apparatus of claim 1, wherein said encoder also encodes a base layer for the at least a portion of the picture, and the deblocking filter is applied jointly at both the base layer and the enhancement layer.

7. The method of claim 2, wherein said encoding step comprises encoding a base layer for the at least a portion of the picture, and the deblocking filter is applied jointly at both the base layer and the enhancement layer.

8. The apparatus of claim 3, wherein said decoder also decodes a base layer for the at least a portion of the picture, and the deblocking filter is applied jointly at both the base layer and the enhancement layer.

9. The apparatus of claim 3, wherein said decoder includes a motion compensation loop.

10. The apparatus of claim 9, wherein the deblocking filter is applied inside the motion compensation loop.

11. The apparatus of claim 9, wherein the deblocking filter is applied outside the motion compensation loop.

12. The method of claim 4, wherein said decoding step comprises decoding a base layer for the at least a portion of the picture, and the deblocking filtering is applied jointly at both the enhancement layer and the base layer.

13. The apparatus of claim 4, wherein the deblocking filtering is applied inside a motion compensation loop.

14. The apparatus of claim 4, wherein the deblocking filtering is applied outside a motion compensation loop.

* * * * *